US 12,145,510 B2

(12) United States Patent
Scholer (10) Patent No.: US 12,145,510 B2
(45) Date of Patent: Nov. 19, 2024

(54) DEVICE FOR A VEHICLE, AND VEHICLE

(71) Applicant: Witte Automotive GmbH, Velbert (DE)

(72) Inventor: Manuel Scholer, Essen (DE)

(73) Assignee: Witte Automotive GmbH, Velbert (DE)

( * ) Notice: Subject to any disclaimer, the term of this patent is extended or adjusted under 35 U.S.C. 154(b) by 34 days.

(21) Appl. No.: 18/078,121

(22) Filed: Dec. 9, 2022

(65) Prior Publication Data

US 2023/0182652 A1      Jun. 15, 2023

(30) Foreign Application Priority Data

Dec. 10, 2021   (DE) ................... 10 2021 214 167.6

(51) Int. Cl.
*B60R 11/04*   (2006.01)
*B60R 11/00*   (2006.01)
*B60R 13/00*   (2006.01)

(52) U.S. Cl.
CPC ............ *B60R 11/00* (2013.01); *B60R 13/005* (2013.01); *B60R 2011/004* (2013.01); *B60R 2011/0082* (2013.01); *B60R 2011/0092* (2013.01)

(58) Field of Classification Search
CPC . B60R 11/00; B60R 13/005; B60R 2011/004; B60R 2011/0082; B60R 2011/0092; B60R 2011/0094; B60R 11/04
See application file for complete search history.

(56) References Cited

U.S. PATENT DOCUMENTS

| 7,891,886 B2 * | 2/2011 | Schuetz | E05B 81/76 348/148 |
| 8,821,043 B2 * | 9/2014 | Schutz | B60R 11/04 396/419 |
| 9,718,414 B2 * | 8/2017 | Da Deppo | B60R 11/04 |
| 9,751,471 B2 * | 9/2017 | Schütz | H04N 23/51 |

(Continued)

FOREIGN PATENT DOCUMENTS

| DE | 102010060573 A1 | 5/2012 |
| DE | 10 2013 018 022 A1 | 5/2015 |

(Continued)

OTHER PUBLICATIONS

German Patent and Trademark Office Search Report; dated Sep. 2, 2022.

(Continued)

*Primary Examiner* — Amy J. Sterling
(74) *Attorney, Agent, or Firm* — Marshall & Melhorn, LLC (57) ABSTRACT

A device for a vehicle may have a fixed support, a sensor unit, which can be moved between a rest position and an operating position, and a protective element for the sensor unit and a decorative element, which can each be moved between a closed position and an open position. The sensor unit may be placed in its operating position when the protective element and the decorative element are in the open position. The sensor unit, the protective element, and the decorative element may be movably coupled to one another by a lever mechanism, and the protective element and the decorative element may be mounted rotatably and coaxially to one another on the support, and the sensor unit may be articulated on the lever mechanism.

14 Claims, 9 Drawing Sheets

(56) References Cited

U.S. PATENT DOCUMENTS

| | | | | |
|---|---|---|---|---|
| 10,668,869 B1* | 6/2020 | Barthel | ................ | G03B 11/043 |
| 2009/0231430 A1* | 9/2009 | Buschmann | ......... | B60Q 1/0023 |
| | | | | 348/148 |
| 2009/0309971 A1* | 12/2009 | Schuetz | ................ | E05B 81/78 |
| | | | | 292/201 |

FOREIGN PATENT DOCUMENTS

| | | |
|---|---|---|
| DE | 10 2015 101 007 A1 | 7/2016 |
| DE | 10 2015 102 726 A1 | 8/2016 |
| DE | 10 2016 113 410 A1 | 1/2018 |
| DE | 10 2019 101 861 A1 | 7/2020 |

OTHER PUBLICATIONS

European Patent Office, Search Report in Application No. EP22212499. 2, dated May 8, 2023, 8 pages, Berlin, Germany.

* cited by examiner

DEVICE FOR A VEHICLE, AND VEHICLE

BACKGROUND

The invention relates to a device for a vehicle, and in particular a motor vehicle, having a movable sensor unit and a movable protective element for covering the sensor unit. Further, the invention relates to a vehicle having such a device.

Devices of the type mentioned at the beginning are known from the prior art, e.g., DE 10 2019 101 861 A1—in particular, an emblem arrangement in the region of a vehicle hood—in which the sensor unit, e.g., a camera, extends via sliding block guides or slideways. Such devices require a lot of installation space—in particular, a large installation depth—and lead to noise.

SUMMARY

The object of the present invention is to specify an improved device, the design of which is simple and compact, with adequate protection, and which is as low noise as possible. Further, a vehicle with such an improved device is to be specified.

With regard to the device, and with regard to the vehicle, the object is achieved according to the invention by the features of the claims described herein.

The dependent claims relate to advantageous developments.

A device according to the invention for a vehicle, and in particular a motor vehicle, comprises at least one fixed support, a movable sensor unit, which can be moved between a rest position and an operating position, a movable protective element for the sensor unit, and an—in particular, separate—movable decorative element, wherein the protective element and the decorative element can each be moved between a closed position and an open position and are arranged one above the other in the respective closed position and cover the sensor unit in its rest position. When the protective element and the decorative element are in the open position, the sensor unit is placed in its operating position, wherein the sensor unit, the protective element, and the decorative element are movably coupled to one another by means of a lever mechanism, and the protective element and the decorative element are mounted rotatably and coaxially to one another on the support, and the sensor unit is articulated on the lever mechanism.

An alternative device according to the invention comprises at least one fixed support, which is designed in particular in the form of a frame, e.g., in the form of an annular disk or in the shape of a rectangle, and has a support opening, a sensor unit, which, between a rest position and an operating position, can be moved through the support opening, and a protective element for the sensor unit and a decorative element, each of which can be moved between a closed position and an open position, wherein the protective element and the decorative element are arranged one above the other in the respective closed position, and cover the sensor unit in its rest position, wherein, when the protective element and decorative element are in the open position, the sensor unit is placed in its operating position, wherein the sensor unit, the protective element, and the decorative element are movably coupled to one another by means of a lever mechanism, and the protective element and the decorative element and the lever mechanism are rotatably and coaxially mounted on the support, and the sensor unit is articulated on the lever mechanism.

The advantages achieved with the invention consist in particular in the fact that an extension movement of the sensor unit via a lever mechanism with exclusively rotational bearing points is particularly low noise. Further, a particularly compact design of the device is provided by a coaxial arrangement of the protective element, decorative element, and optional lever mechanism. Coaxial arrangement of the protective element and of the decorative element or of all three components—of the protective element, the decorative element, and the lever mechanism—is understood in particular to mean that they have a corresponding pivot axis and thus rotate about the same pivot axis (also called axis of rotation). The covering of the sensor unit in the rest position, both by means of the protective element and by means of the decorative element, ensures that the sensor unit is mounted securely and is protected.

For example, on a rear side, the support has a first fixed pivot axis, which forms a first fixed pivot point for the lever mechanism, and, on a front side, a second fixed pivot axis, which forms a second fixed pivot point for both the lever mechanism and for the protective element and the decorative element.

In one possible embodiment, the protective element and the decorative element are articulated on the support via the second fixed pivot point and can be moved synchronously between the closed position and the open position. When the protective element and the decorative element are in the respective closed position, they are arranged, for example, parallel to one another. In particular, they are arranged adjacent to one another. In this case, the protective element and the decorative element can be arranged at a distance from one another—in particular, a small distance—for example, in the millimeter range. This enables a simple and compact design of the adjusting mechanism—in particular, of the lever mechanism—and thus of the device.

In particular, the sensor unit can be moved, relative to the support, between the rest position and the operating position by means of the lever mechanism. For example, the sensor unit can be adjusted between the rest position and the operating position by means of the lever mechanism via a combined translational and rotational movement. The protective element and the decorative element can be pivoted, relative to the support, between the closed position and the open position by means of the lever mechanism.

In one possible embodiment, the lever mechanism comprises at least two levers which can each be pivoted on the fixed support about a fixed pivot axis and are articulated on the sensor element about a movable pivot axis. In other words, the lever mechanism comprises two fixed, rotary bearing points—in particular, fixed rotary joints—on the support and two movable, and in particular "accompanying," rotary bearing points—in particular, movable rotary joints—on the sensor element.

The lever mechanism preferably comprises a first lever and a second lever. For example, the first lever is articulated on a first support side. The second lever is articulated on a second support side. The second support side is formed opposite the first support side on the support. For example, the first support side forms an inner side and the second support side forms an outer side of the support.

Further, the first lever can be pivoted on the first support side about the first fixed pivot axis and is designed as a first pivot lever for extending and retracting the sensor unit relative to the support. The first pivot lever can, on the one hand, be pivotable on the fixed support about the first fixed pivot axis and, on the other, be articulated on the sensor element about a first movable pivot axis.

The second lever can be pivoted on the second support side about the second fixed pivot axis, which in particular simultaneously forms the pivot point of the protective element and of the decorative element. The second lever forms in particular a second pivot lever both for retracting and for extending the sensor unit and, in particular, simultaneously, for both folding in and folding out both the protective element and the decorative element. The second pivot lever can, on the one hand, be pivotable on the fixed support about the second fixed pivot axis and, on the other, be articulated on the sensor element about a second movable pivot axis.

The first movable pivot axis and the second movable pivot axis simultaneously also form bearing axes supporting the sensor element. This enables a space-saving and compact device.

The fixed support has a support opening through which the sensor unit can be moved between its rest position and its operating position.

Further, the protective element and the decorative element are spaced apart from one another in the closed position. In particular, a damping element, e.g., a rubber ring or a rubber buffer, is arranged between the protective element and the decorative element. The damping element can simultaneously form a sealing element. This enables a particularly low-noise device, which is simultaneously protected against contamination. In particular, in the closed position, the protective element and the decorative element are pulled against the damping element and/or the sealing element by means of the lever mechanism. Advantageously, the sealing element completely surrounds the support opening. Likewise, the damping element can completely surround the support opening or, alternatively, be formed in regions.

Further, the lever mechanism can be coupled to a shaft which can be rotatably driven by an electric motor and to which one of the levers is connected in a rotationally-fixed manner. As a result, the device is designed to be motor-adjustable.

The protective element is designed, for example, as a cover element for the sensor unit—in particular, an inner cover element. The decorative element is designed, for example, as an emblem, e.g., a manufacturer's emblem, a mark, a symbol, or a brand emblem—in particular, an external emblem. In addition, the emblem may have one or more lighting means for illuminating the emblem.

The sensor unit is, for example, a surroundings sensor—in particular, an ultrasonic sensor, laser sensor, radar sensor, lidar sensor, or a camera sensor.

A vehicle, and in particular a motor vehicle, comprises the device described above. For example, the device is arranged at the front on an engine hood or front hood or at the rear on a hatch lid or trunk lid, wherein the sensor unit—in particular, a surroundings monitoring unit, such as a camera—is covered in its retracted rest position by the protective element and the decorative element in their closed positions, and is arranged behind the protective element and the decorative element such that it is inaccessible from the outside. When the sensor unit is in the extended operating position, it is extended through the support opening and is accessible from the outside, and can thus monitor the vehicle surroundings.

The device is in particular designed as a pre-assembled assembly unit.

The design of the device means that minimal installation space is required. Thus, use of the device in and/or on a vehicle can be realized without structural change—at least of individual vehicle parts. In particular, the device can be adapted to different vehicle geometries, so that the device can be used in various vehicle series.

DESCRIPTION OF THE FIGURES

Embodiments of the invention are explained in greater detail with reference to the accompanying drawings.

Parts corresponding to one another are provided with the same reference signs in all figures.

DETAILED DESCRIPTION

Figure 1:
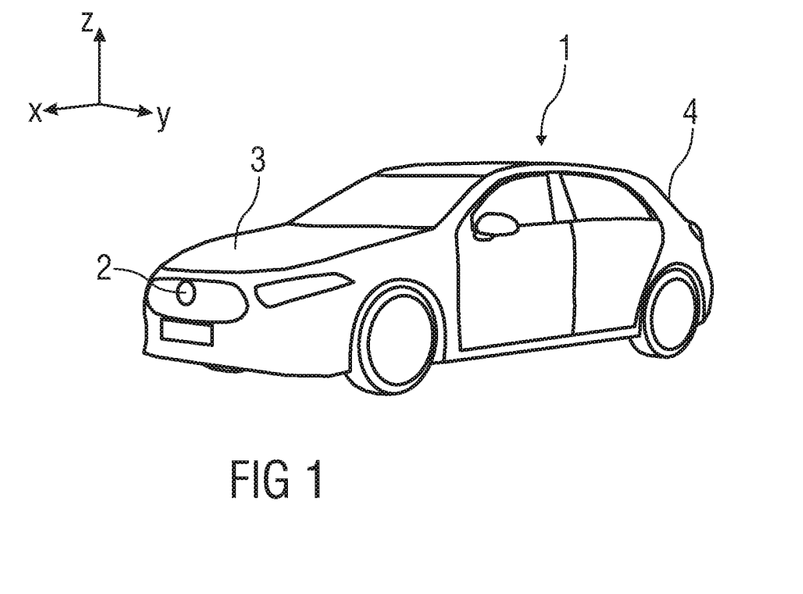
FIG. 1 shows a vehicle having a device according to the invention.

FIG. 1 schematically shows a vehicle 1 having a device 2 according to the invention. For example, the device 2 is arranged at the front on an engine hood 3 and/or at the rear on a trunk lid 4. The device 2 has a closed position and a fully open position in which the surroundings of the vehicle 1 can be monitored. FIG. 1 shows the device 2 in the closed position. The device 2 is designed as a pre-assembled assembly unit which, in the pre-assembled state, can be arranged on and fastened to the vehicle 1.

Vehicle 1 shown schematically in FIG. 1 is described below using three spatial directions extending perpendicular to one another. A longitudinal direction X extends substantially horizontally and preferably parallel to a longitudinal direction of the vehicle corresponding to the usual direction of travel of the vehicle 1. A transverse direction Y extending perpendicular to the longitudinal direction X is likewise oriented horizontally in the vehicle 1 and runs parallel to a transverse direction of the vehicle. A vertical direction Z runs perpendicular to the longitudinal direction X and perpendicular to the transverse direction Y. In vehicle 1, the vertical direction Z preferably runs parallel to a vertical axis of the vehicle.

The positional information and directional information used, such as, for example, front, rear, top, and bottom, refer to a viewing direction of an occupant sitting in the vehicle 1 in a normal sitting position and looking in the direction of travel.

Figure 2:
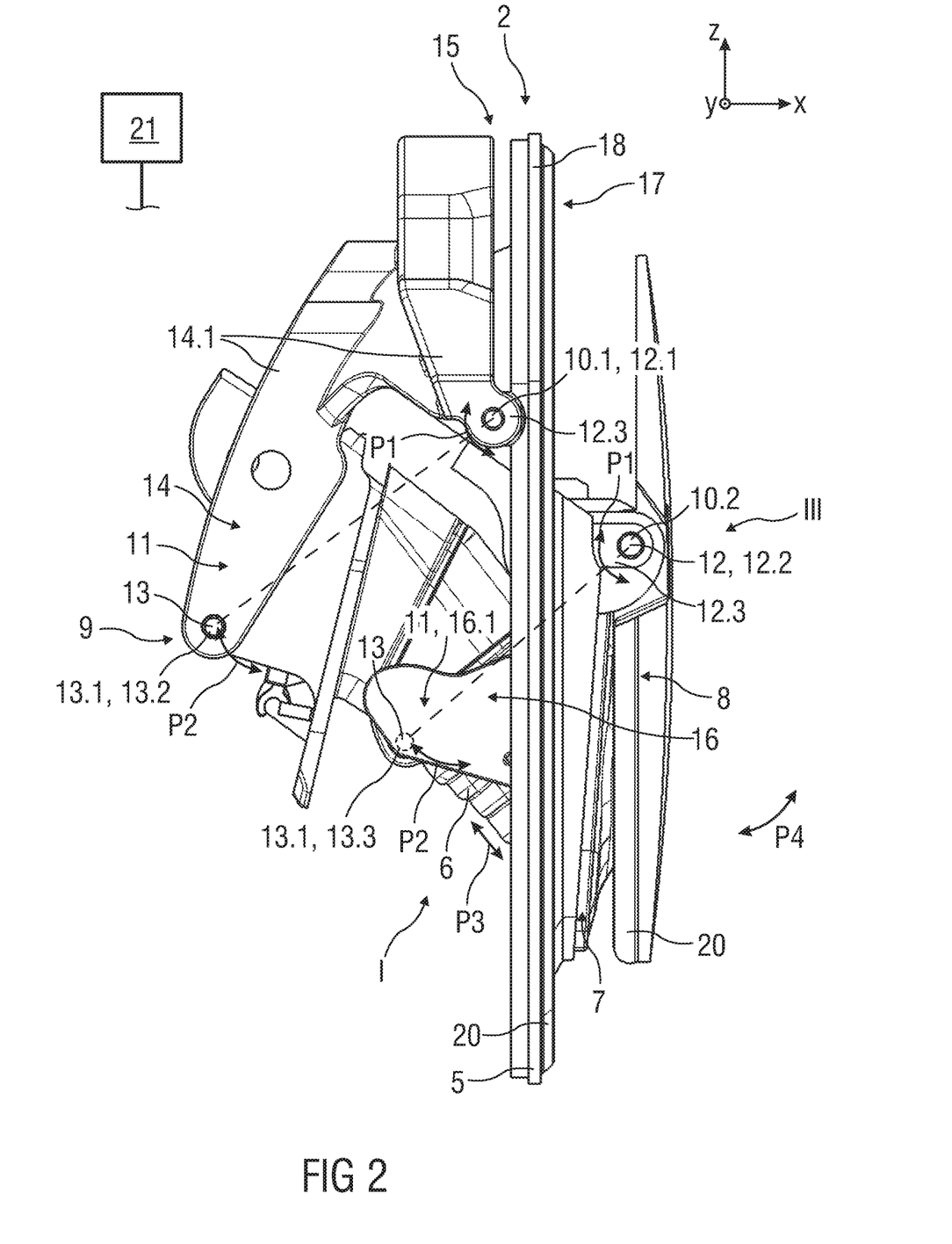
FIG. 2 shows a view of an embodiment of the device according to the invention in the closed position.
Figure 3:
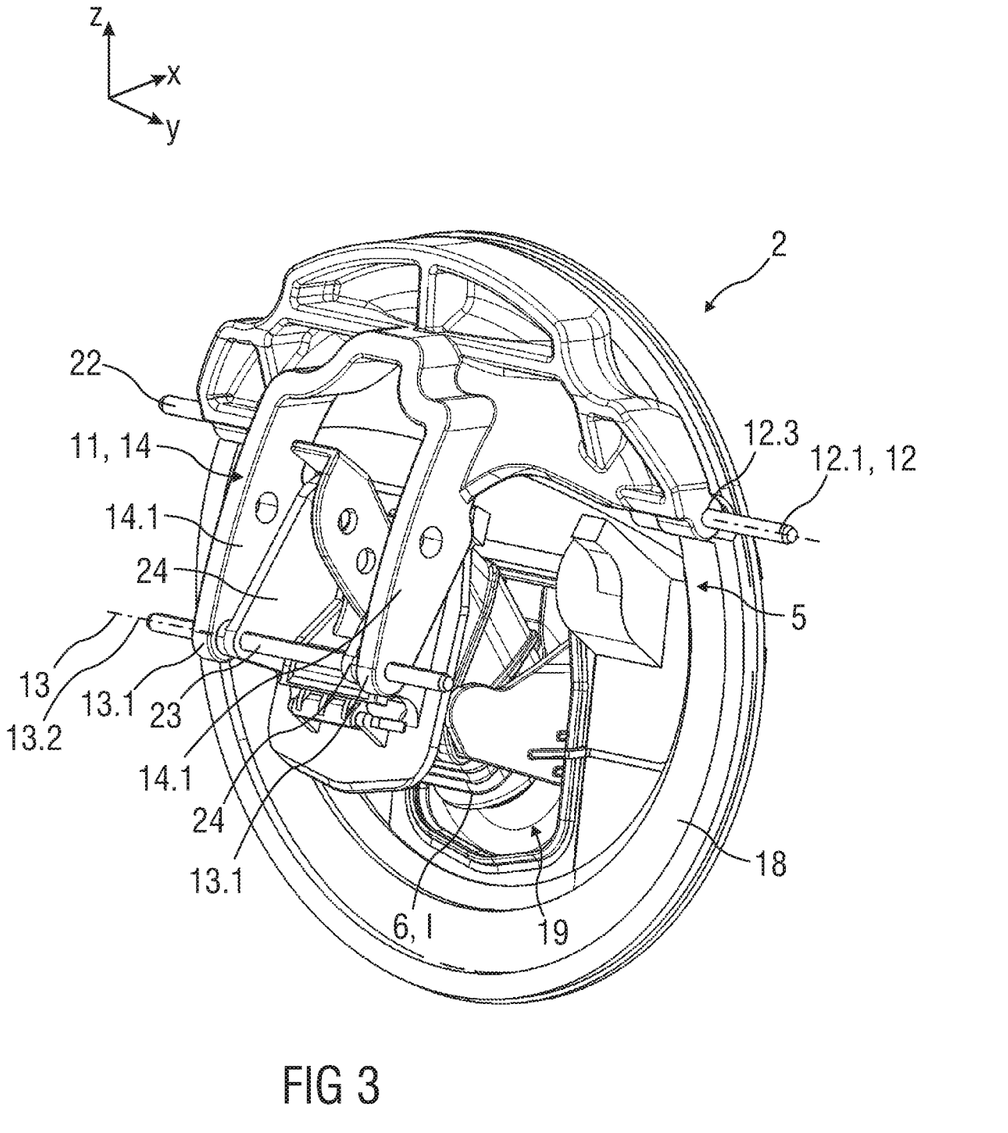
FIG. 3 shows a view of a further embodiment of the device according to the invention in the closed position.
Figure 4:
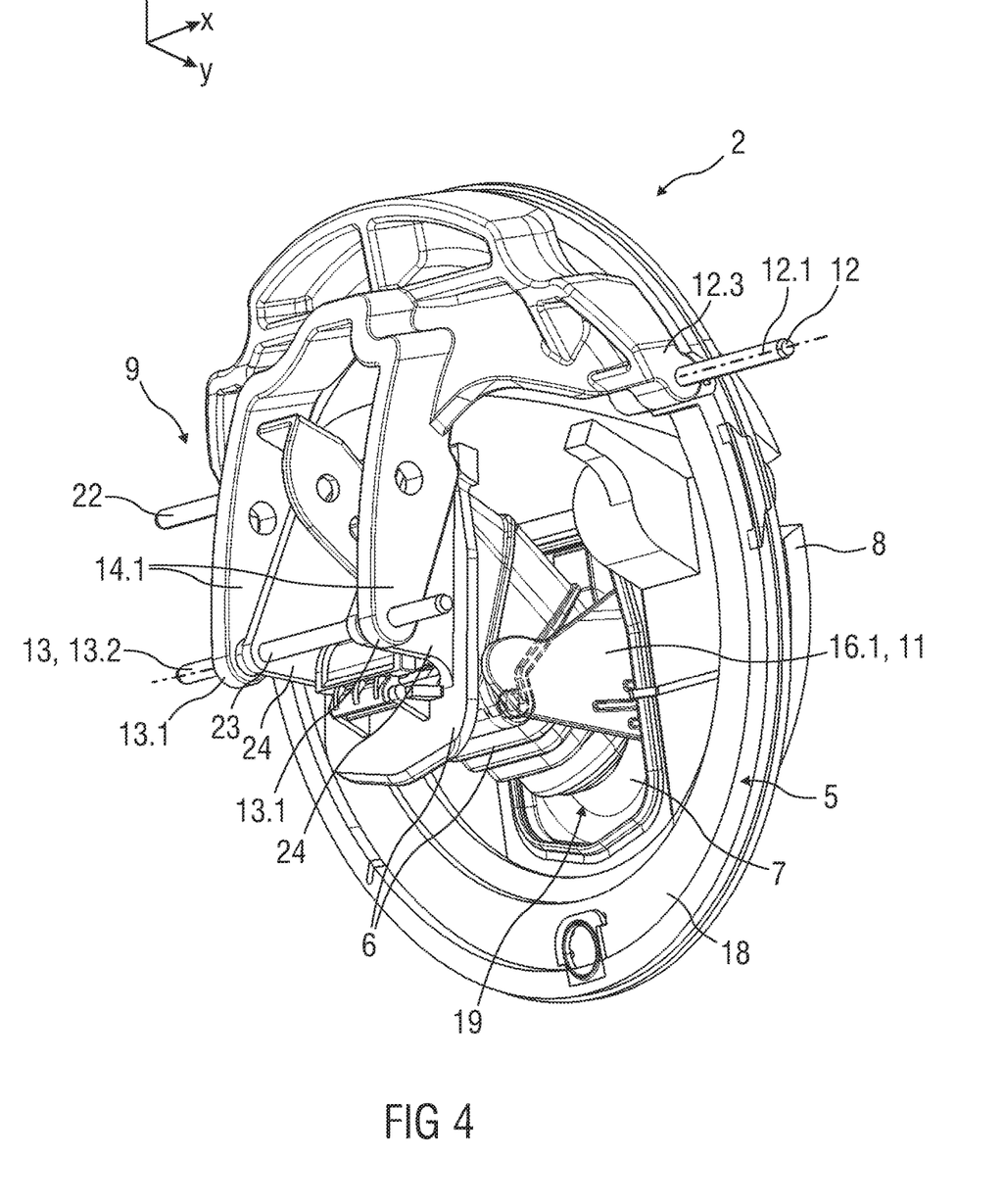
FIG. 4 shows a view of a further embodiment of the device according to the invention in the closed position.
Figure 5:
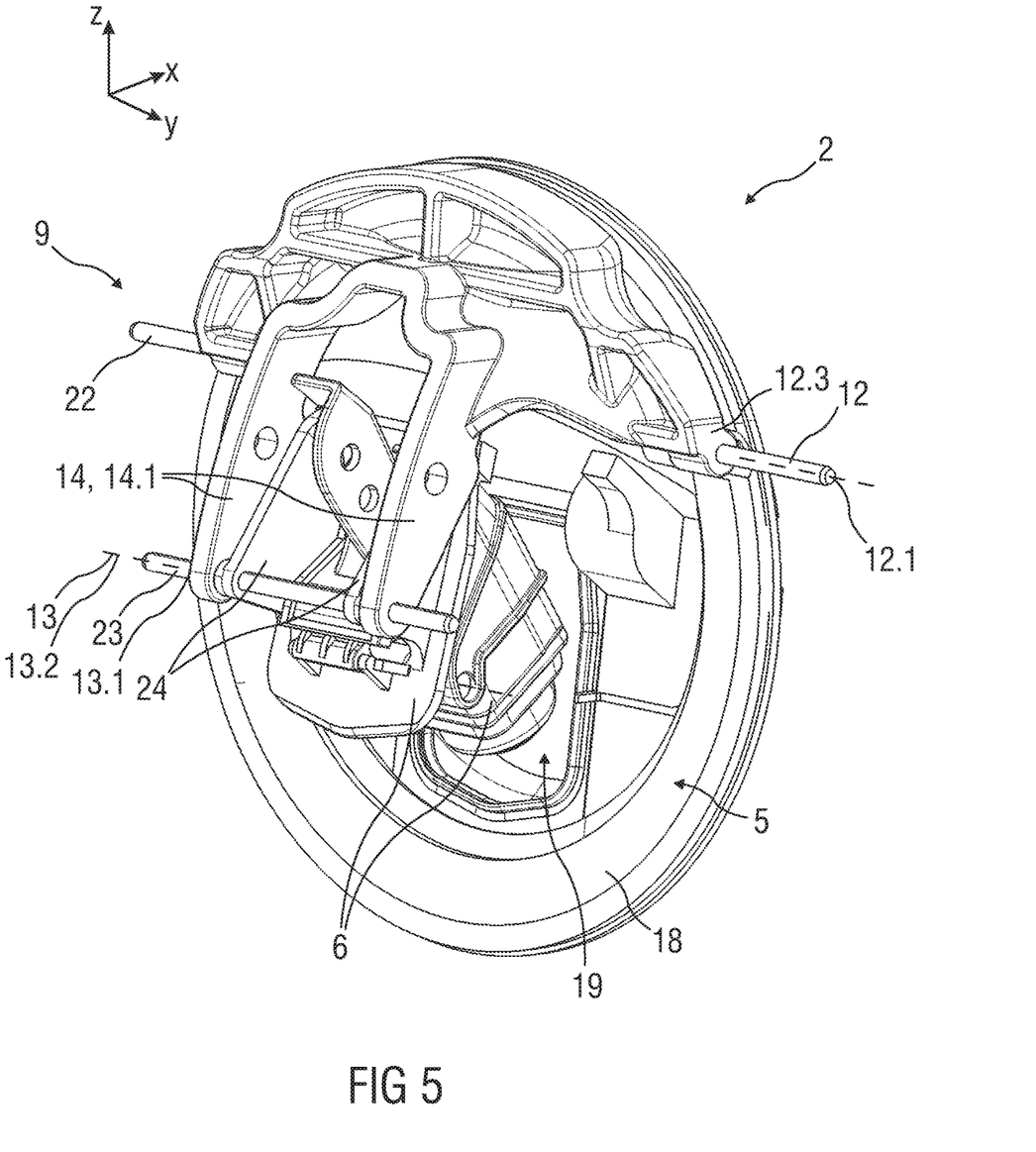
FIG. 5 shows a view of a further embodiment of the device according to the invention in the closed position.

FIG. 2 schematically shows a side view of an embodiment of the device 2 according to the invention in the closed position. FIGS. 3 through 5 schematically show different perspectival views of the device 2 in the closed position.

The device 2 comprises at least one fixed support 5, a movable sensor unit 6, which can be moved between a rest position I (shown in FIGS. 2 through 5) and an operating position II (shown in FIGS. 8 and 9), a movable protective element 7 for the sensor unit 6, and a movable decorative element 8.

The protective element 7 is designed, for example, as a cover element—in particular, an inner sensor cover or an inner sensor flap. The decorative element 8 is, for example, an emblem—in particular, an outer emblem, a brand emblem. In addition, the emblem may have one or more lighting means for illuminating the emblem. The decorative element 8 can also be designed as an actuating element for a lock or a latch and can be coupled to a lock (not shown in detail) or to a latch (not shown in detail).

Figure 8:
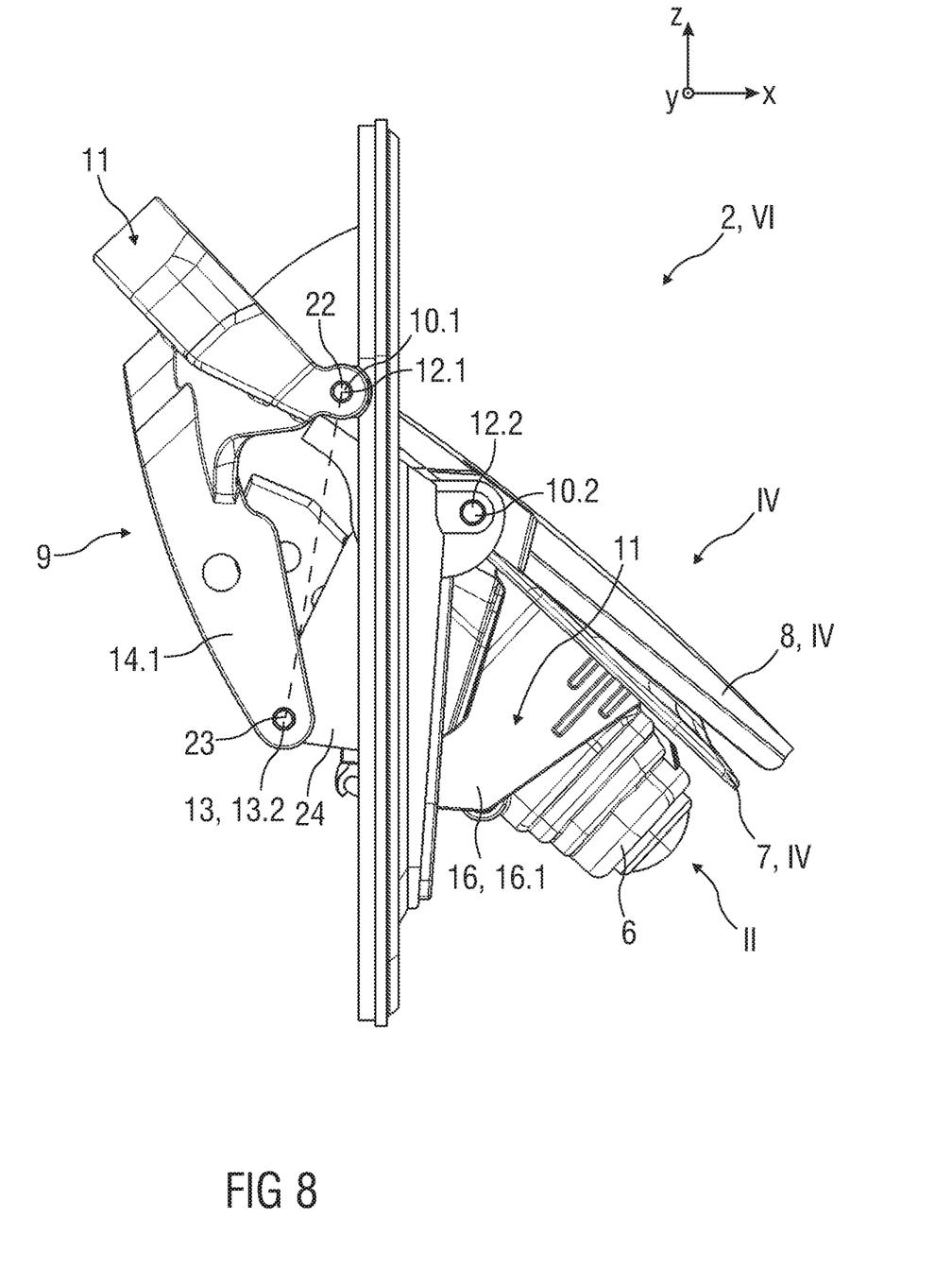
FIG. 8 shows a schematic perspectival view of a first support side of the device according to the invention in the fully open position.
Figure 9:
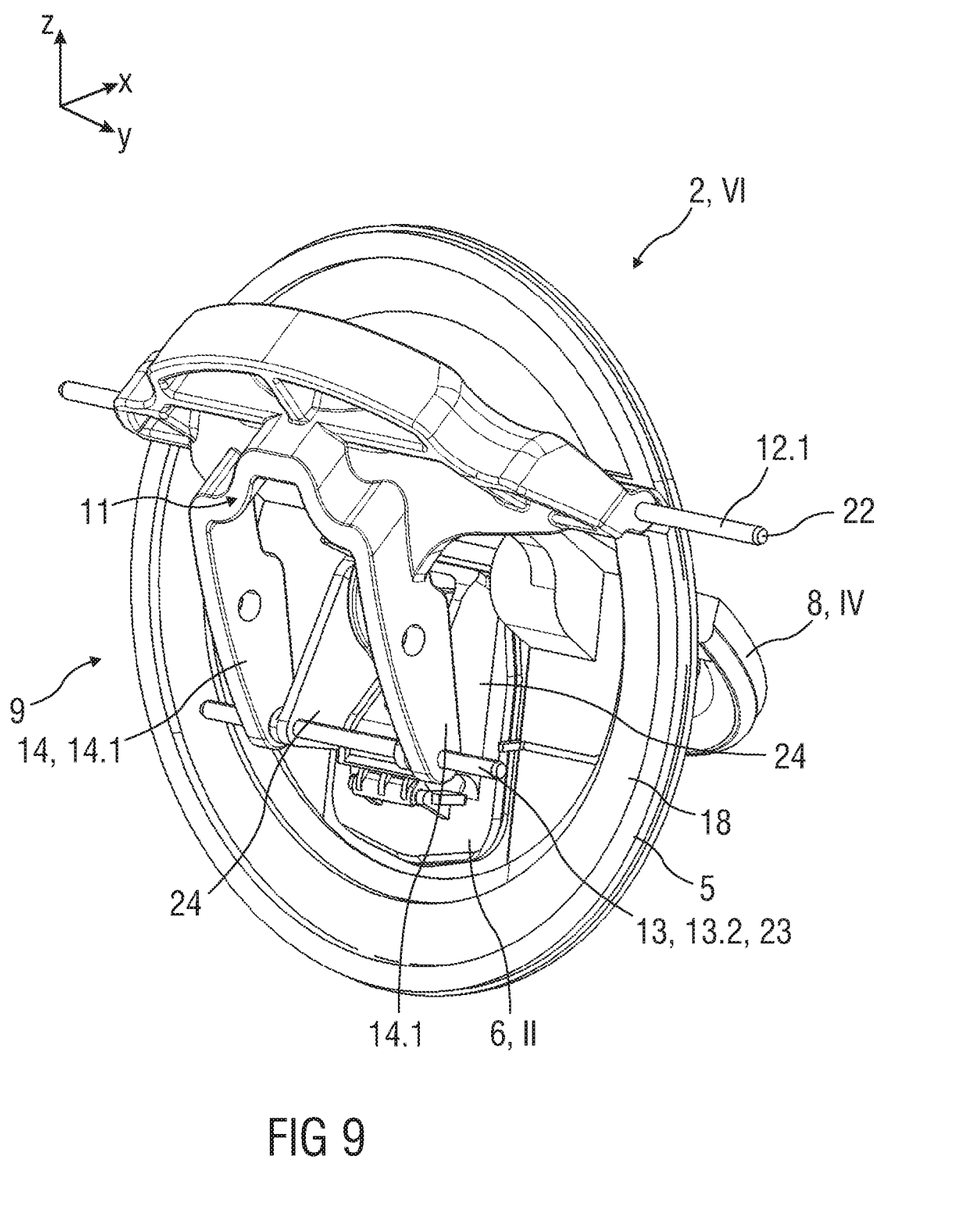
FIG. 9 shows a schematic side view of the device according to FIG. 5 in the fully open position.

The protective element 7 and the decorative element 8 can each be moved between a closed position III, as shown in FIGS. 2 through 5, and an open position IV, as shown in FIGS. 8 and 9.

When the protective element 7 and the decorative element 8 are in the respective closed position III, they are arranged, for example, approximately parallel to one another. In particular, they are arranged adjacent to one another. In this case, the protective element 7 and the decorative element 8 can be arranged at a distance from one another—in particular, a small distance—for example, in the millimeter range. In addition, when the protective element 7 and the decorative element 8 are in their closed position III, they cover the sensor unit 6 in its rest position I.

When the protective element 7 and the decorative element 8 are in the open position IV, the sensor unit 6 is placed in its operating position II, as shown in FIGS. 8 and 9.

The sensor unit 6, the protective element 7, and the decorative element 8 are movably coupled to one another by means of a lever mechanism 9. The protective element 7 and the decorative element 8 are mounted rotationally and coaxially on the support 5 relative to one another. The sensor unit 6 is articulated on the lever mechanism 9. The lever mechanism 9 is in turn articulated on the support 5.

For example, the support 5 has, on a rear side 15 (also called the inner side or the first support side), a first fixed pivot axis 12.1, which forms a first pivot point 10.1 for the lever mechanism 9, and, on a front side 17 (also called outer side or second support side), a second fixed pivot axis 12.2, which forms a second fixed pivot point 10.2 for both the lever mechanism 9 and for the protective element 7 and the decorative element 8. The fixed pivot points 10.1 and 10.2 are designed as fixed pivot axes 12.

The sensor unit 6 is in particular a surroundings monitoring unit, such as a camera, a radar sensor, an ultrasound unit.

In the retracted rest position I of the sensor unit 6, the latter is completely covered by the protective element 7 and the decorative element 8 in their closed positions III. In particular, the sensor unit 6 is arranged behind the protective element 7 and the decorative element 8 so as to be inaccessible from the outside.

The protective element 7 and the decorative element 8 are articulated and pivotably mounted on the support 5 via the common, second fixed pivot point 10.2. In this case, the protective element 7 and the decorative element 8 can be moved—in particular, pivoted—synchronously between their closed position III and the open position IV. This enables a simple and compact design of the adjusting mechanism—in particular, of the lever mechanism 9—and thus of the device 2.

In particular, the sensor unit 6 can be moved relative to the support 5 between the rest position I and the operating position II by means of the lever mechanism 9. For example, the sensor unit 6 can be adjusted between the rest position I and the operating position II by means of the lever mechanism 9 via a combined translational and rotational movement.

The protective element 7 and the decorative element 8 can be pivoted relative to the support 5 between the closed position III and the open position IV by means of the lever mechanism 9.

The lever mechanism 9 comprises at least two levers 11, which, by means of a lever end on the fixed support 5, can each be pivoted about the fixed pivot axes 12. With the opposite lever ends, the two levers 11 on the sensor element 6 are each articulated on movable pivot axes 13.

In other words, the lever mechanism 9 comprises, as fixed pivot axes 12, two fixed bearing points 12.3—in particular, fixed rotary joints—on the support 5. The two fixed bearing points 12.3 form the first fixed pivot point 10.1 and the second fixed pivot point 10.2 of the lever 11.

Further, the lever mechanism 9 comprises, as movable pivot axes 13, a first movable pivot axis 13.2 and a second movable pivot axis 13.3. The first movable pivot axis 13.2 and the second movable pivot axis 13.3 are formed as two movable, and in particular "accompanying," bearing points 13.1—in particular, movable joints—on the sensor element 6. The pivoting movement of the levers 11 about the fixed pivot axes 12 according to arrow P1 leads to a corresponding pivoting movement of the movable pivot axes 13 according to arrow P2, which causes an extension movement or retraction movement of the sensor element 6 according to arrow P3. In other words, the first movable pivot axis 13.2 and the second movable pivot axis 13.3 simultaneously also form bearing axes supporting the sensor element 6.

For example, the lever mechanism 9, as lever 11, comprises a first lever 14 (also referred to as lever arm), which, on the one hand, is fixedly articulated on the first support side 15 and, on the other, is movably articulated on the sensor unit 6.

In addition, the lever mechanism 9 comprises, as a further lever 11, a second lever 16, which, on the one hand, is fixedly articulated on the second support side 17 and, on the other, is movably articulated on the sensor unit 6. The second support side 17 is formed opposite the first support side 15 on the support 5. For example, the first support side 15 forms an inner side and the second support side 17 forms an outer side of the support 5 and the device 2.

The first lever 14 can be pivoted on the first support side 15 about the first fixed pivot axis 12.1 according to arrow P1 and is designed as a first pivot lever 14.1 for extending and retracting the sensor unit 6 relative to the support 5. The first pivot lever 14.1 is, for example, a profile element, formed, for example, as an L-shaped lever arm. The dashed line between the first fixed pivot axis 12.1 and the first movable pivot axis 13.2 represents a straight, virtual pivot arm (shown in dashed lines) for the first pivot lever 14.1.

The lever mechanism 9 can have a pair of first pivot levers 14.1, which are each articulated at a first end on opposite sides on the sensor element 6, as is shown in FIGS. 3 through 5.

The pair of first pivot levers 14.1 can be designed as a single profile element—in particular, a molded component—e.g., U-shaped profile, with freely protruding arms, as first pivot lever 14.1. The first pivot levers 14.1 form a portion of the lever 11 formed as a one-piece molded component. Alternatively, the first pivot levers 14.1 can be designed as separate lever arms.

The second lever 16 can be pivoted on the second support side 17 about the second fixed pivot axis 12.2 according to arrow P1 and is designed as a second pivot lever 16.1 both for extending and retracting the sensor unit 6 relative to the support 5 according to arrow P3 and for pivoting the protective element 7 and the decorative element 8 open or closed according to arrow P4. The dashed line between the second fixed pivot axis 12.2 and the second movable pivot axis 13.3 represents a straight, virtual pivot arm (shown in dashed lines in FIG. 2) for the second pivot lever 16.1.

The second pivot lever 16.1 is, for example, a profile element—for example, as an I-shaped or L-shaped lever arm. The lever mechanism 9 can have a pair of second pivot levers 16.1, which are each articulated on opposite sides on the sensor element 6 and on opposite sides of the associated fixed bearing point 12.2, as is shown in FIGS. 3 through 5. The pair of second pivot levers 16.1 can be designed as a single profile element—in particular, a one-piece molded component—with freely protruding arms, as second pivot lever 16.1. Alternatively, the second pivot levers 16.1 can be designed as separate lever arms.

The second lever 16 can be pivoted on the second support side 17 about the second fixed pivot axis 12.2, which forms the common, second fixed pivot point 10.2 of the protective element 7 and of the decorative element 8. The protective element 7 and the decorative element 8 can be articulated directly on the second fixed pivot axis 12.2. Alternatively, they can be articulated on the second fixed pivot axis 12.2 via the second lever 16. The second lever 16 forms a second pivot lever 16.1 both for the protective element 7 and the decorative element 8. Furthermore, the second lever 16 forms a second pivot lever 16.1 for a retraction movement and extension movement of the sensor element 6. The second lever 16 has an L-shape, for example.

The lever mechanism 9 can have a pair of second levers 16, which are each articulated on opposite sides on the sensor element 6.

The fixed pivot axes 12, 12.1, 12.2 run perpendicular to the first levers 14 and the second levers 16. The fixed pivot axes 12, 12.1, 12.2 are spaced apart from one another and, for example, separated from one another by a basic element 18 of the support 5. In this case, one of the fixed pivot axes 12—in particular, the first fixed pivot axis 12.1—is arranged on the first support side 15—for example, an inner side of the device 2. The other fixed pivot axis 12—in particular, the second fixed pivot axis 12.2—is arranged on the second support side 17 of the support 5 opposite the first support side 15. The second support side 17 forms an outer side of the device 2.

Furthermore, the protective element 7 and the decorative element 8 are spaced apart from one another in the closed position III and in particular are arranged parallel to one another. For example, a damping element 20, e.g., a rubber ring or a rubber buffer, is arranged between the protective element 7 and the decorative element 8. The damping element 20 can simultaneously form a sealing element. This enables a particularly low-noise device 2, which is simultaneously protected against contamination. In particular, in the closed position III, the protective element 7 and the decorative element 8 are pulled against the damping element 20 by means of the lever mechanism 9.

FIG. 3 shows a perspective view of the device 2 in a plan view of the first support side 15.

The fixed support 5 has a support opening 19 (shown in FIG. 3), through which the sensor unit 6 can be moved between its rest position I and its operating position II. In addition, a further damping element 20 can be arranged between the protective element 7 and the support 15. This damping element 20 can, advantageously, completely surround the support opening 19.

Further, the lever mechanism 9 can be coupled to a shaft which can be rotatably driven by an electric motor 21 and to which one of the levers 11, e.g., the first lever 14 or the pair of first levers 14, is connected in a rotationally-fixed manner. As a result, the device 2 is designed to be motor-adjustable.

In the region of the first fixed pivot axis 12.1, a first bearing shaft 22 is arranged on which the first pivot levers 14.1 are rotationally articulated.

In the region of the first movable pivot axis 13.2, a second bearing shaft 23 is arranged on which the first pivot levers 14.1 and the sensor element 6 are rotationally articulated by means of fastening tabs 24 (shown in FIG. 3).

FIGS. 4 and 5 show further perspectival representations of the device 2 in a plan view of the first support side 15 to illustrate the articulation points in the region of the first fixed pivot axis 12.1 and the first movable pivot axis 13.2, wherein the device 2 is shown in the closed position.

In FIG. 5, the second lever 16 and the protective element 7 and the decorative element 8 are, for greater clarity, not shown.

Figure 6:
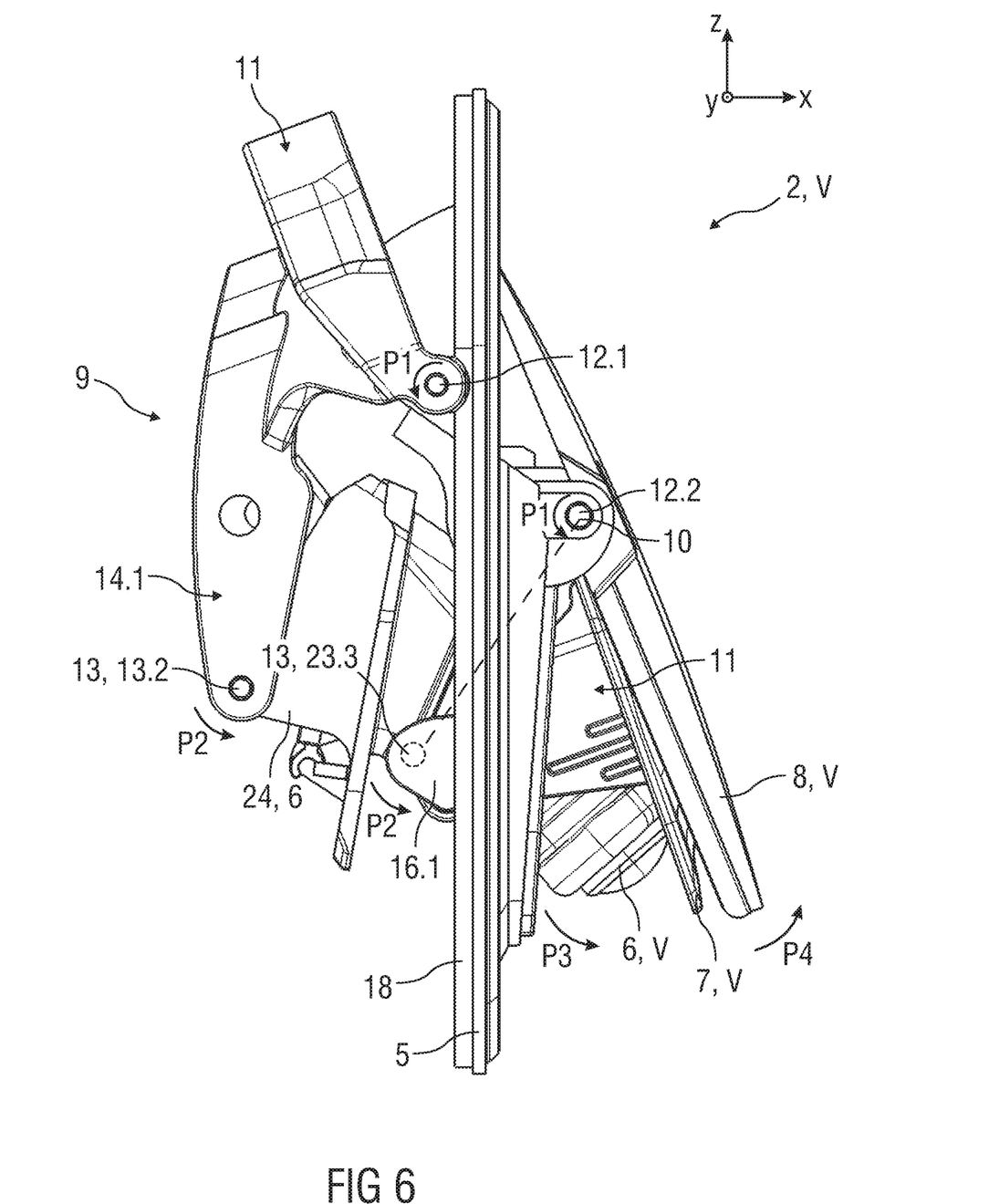
FIG. 6 shows a schematic side view of a first support side of the device according to the invention in a partially open position.

FIG. 6 schematically shows a side view of the first support side 15 of the device 2 according to the invention in a partially extended position V.

Figure 7:
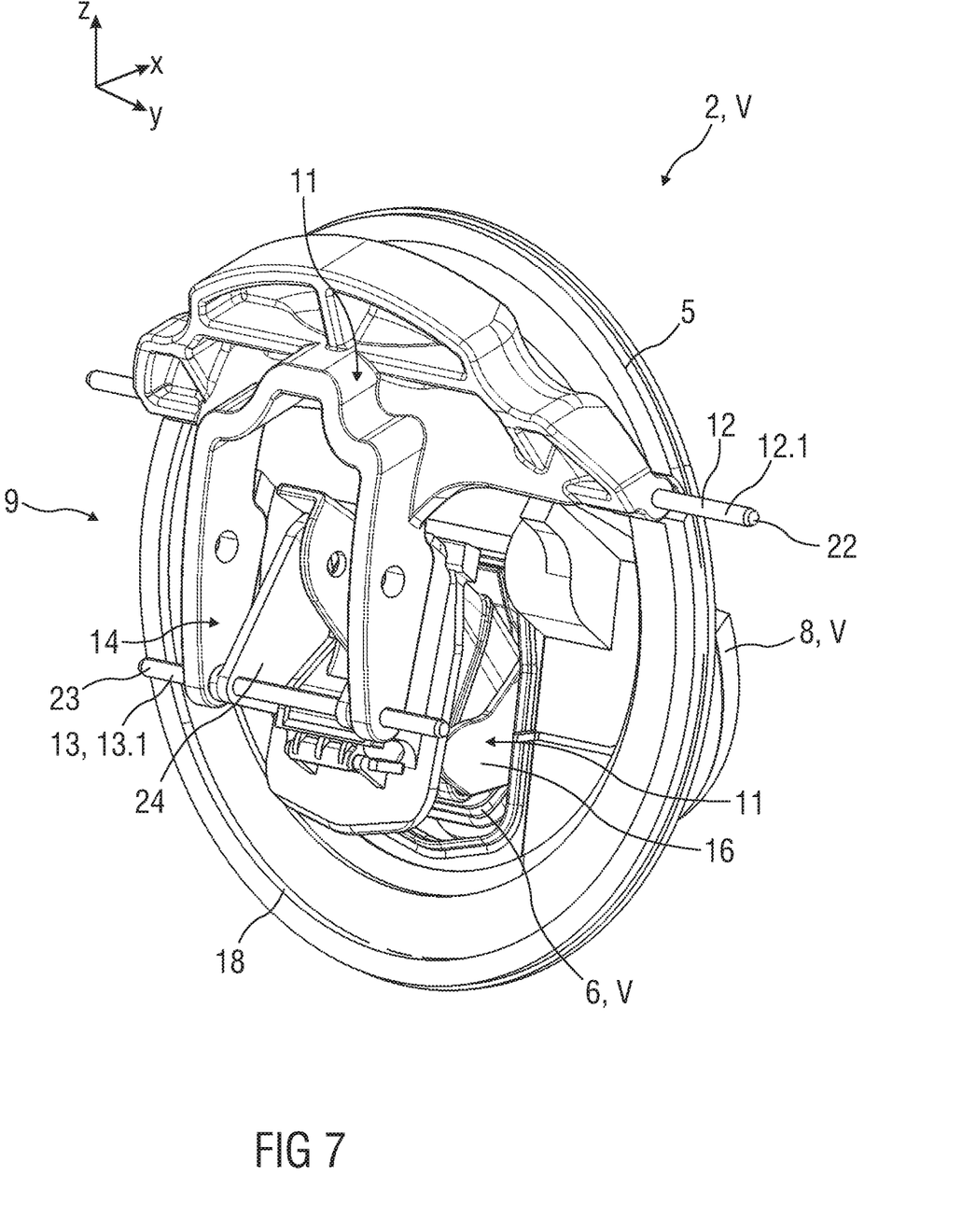
FIG. 7 shows a schematic perspectival view of the device according to FIG. 3 in the partially open position.

FIG. 7 shows a schematic perspective view of the device 2 according to FIG. 6 in the partially open position V.

FIG. 8 schematically shows a side view of the first support side 15 of the device 2 according to the invention in the fully extended position VI.

When the sensor unit 6 is in the fully extended operating position II, it is extended through the support opening 19 and is accessible from the outside and can thus detect the vehicle surroundings.

FIG. 9 schematically shows a perspective view of the device 2 according to FIG. 5 in the fully extended position VI.

LIST OF REFERENCE SIGNS

1 Vehicle
2 Device
3 Engine hood
4 Trunk lid
5 Support
6 Sensor unit
7 Protective element
8 Decorative element
9 Lever mechanism
10.1 First fixed pivot point
10.2 Second fixed pivot point
11 Lever
12 Fixed pivot axis
12.1 First fixed pivot axis
12.2 Second fixed pivot axis
12.3 Fixed bearing point
13 Movable pivot axis
13.1 Movable bearing point
13.2 First movable pivot axis
13.3 Second movable pivot axis
14 First lever
14.1 First pivot lever
15 First support side
16 Second lever
16.1 Second pivot lever
17 Second support side
18 Basic element
19 Support opening
20 Damping element 21 Electric motor
22 First bearing shaft
23 Second bearing shaft
24 Fastening tab
I Rest position
II Operating position
III Closed position
IV Open position
V Partially extended position
VI Fully extended position
X Longitudinal direction
Y Transverse direction
Z Vertical direction

The invention claimed is:

1. A device for a motor vehicle, comprising:
a fixed support,
a sensor unit, which can be moved between a rest position and an operating position,
a protective element for the sensor unit and a decorative element, which can each be moved between a closed position and an open position,
wherein the protective element and the decorative element are arranged one above the other in the respective closed position and cover the sensor unit in its rest position,
wherein the sensor unit is placed in its operating position when the protective element and the decorative element are in the open position,
wherein the sensor unit, the protective element, and the decorative element are movably coupled to one another by a lever mechanism, and the protective element and the decorative element are mounted rotatably around a common rotation axis and coaxially to one another on the support, and the sensor unit is articulated on the lever mechanism.

2. A device for a motor vehicle, comprising:
a fixed support having a support opening,
a sensor unit, which, between a rest position and an operating position, can be moved through the support opening,
a protective element for the sensor unit and a decorative element, which can each be moved between a closed position and an open position,
wherein the protective element and the decorative element are arranged one above the other in the respective closed position and cover the sensor unit in its rest position,
wherein the sensor unit is placed in its operating position when the protective element and the decorative element are in the open position,
wherein the sensor unit, the protective element, and the decorative element are movably coupled to one another by a lever mechanism, and the protective element and the decorative element and the lever mechanism are rotatably mounted around a common rotation axis and coaxially mounted on the support, and the sensor unit is articulated on the lever mechanism.

3. The device according to claim 1, wherein, on a rear side, the support has a first fixed pivot axis, which forms a first fixed pivot point for the lever mechanism, and, on a front side, a second fixed pivot axis, which forms a second fixed pivot point for both the lever mechanism and for the protective element and the decorative element.

4. The device according to claim 3, wherein the protective element and the decorative element are articulated on the support via the second fixed pivot point and can be moved synchronously between the closed position and the open position.

5. The device according to claim 1, wherein the lever mechanism comprises a first lever articulated on a first support side and a second lever articulated on a second support side.

6. The device according to claim 5, wherein the first lever can be pivoted on the first support side about the first fixed pivot axis and is designed as a first pivot lever both for retracting and for extending the sensor unit.

7. The device according to claim 6, wherein the first pivot lever on the fixed support can be pivoted about the first fixed pivot axis and is articulated on the sensor element about a first movable pivot axis.

8. The device according to claim 7, wherein the second lever can be pivoted on the second support side about the second fixed pivot axis and is designed as a second pivot lever both for retracting and for extending the sensor unit.

9. The device according to claim 8, wherein the second pivot lever can be pivoted on the fixed support about the second fixed pivot axis and is articulated on the sensor element about a second movable pivot axis.

10. The device according to claim 9, wherein the first movable pivot axis and the second movable pivot axis are simultaneously also the bearing axes supporting the sensor element.

11. The device according to claim 1, wherein the protective element and the decorative element are spaced apart from one another in the closed position.

12. The device according to claim 1, wherein the lever mechanism is coupled to a shaft which can be rotatably driven by an electric motor and to which one of the levers is connected in a rotationally-fixed manner.

13. The device according to claim 1, wherein the decorative element is designed as an emblem.

14. The device according to claim 1, wherein the sensor unit is a surroundings sensor.

* * * * *